(12) United States Patent
Martins Sena et al.

(10) Patent No.: US 10,510,184 B2
(45) Date of Patent: Dec. 17, 2019

(54) METHOD AND DEVICE FOR DETERMINING ILLUMINATION OF 3D VIRTUAL SCENE

(71) Applicant: SAMSUNG ELECTRONICS CO., LTD., Suwon-si (KR)

(72) Inventors: David Bernardino Martins Sena, Middlesex (GB); Thomas Cooper, Greater Manchester (GB); Andrew William Garrard, Berkshire (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/781,908

(22) PCT Filed: Dec. 14, 2016

(86) PCT No.: PCT/KR2016/014636
§ 371 (c)(1),
(2) Date: Jun. 6, 2018

(87) PCT Pub. No.: WO2017/099557
PCT Pub. Date: Jun. 15, 2017

(65) Prior Publication Data
US 2018/0365886 A1    Dec. 20, 2018

(30) Foreign Application Priority Data
Dec. 9, 2015    (GB) .................................. 1521698.9

(51) Int. Cl.
*G06T 15/50* (2011.01)
*G06T 15/06* (2011.01)

(52) U.S. Cl.
CPC ............ *G06T 15/506* (2013.01); *G06T 15/06* (2013.01)

(58) Field of Classification Search
None
See application file for complete search history.

(56) References Cited

U.S. PATENT DOCUMENTS 7,859,530 B2    12/2010    Tomson et al.
7,884,819 B2    2/2011    Kuesel et al.
(Continued)

FOREIGN PATENT DOCUMENTS

JP    2009-514059 A    4/2009
JP    2010-505164 A    2/2010
(Continued)

OTHER PUBLICATIONS

Search Report dated Mar. 21, 2017, issued by the International Searching Authority in International Application No. PCT/KR2016/014636 (PCT/ISA/210).
(Continued)

*Primary Examiner* — Michelle Chin
(74) *Attorney, Agent, or Firm* — Sughrue Mion, PLLC

(57) ABSTRACT

A method includes: dividing the 3D virtual scene by using a plurality of grids; acquiring location information about a plurality of first points at which a plurality of rays originating from a light source are incident on one or more objects located within the 3D virtual scene and location information about a plurality of first grids including the plurality of first points; acquiring location information about a plurality of second points at which the plurality of rays reflected from the plurality of first points are incident on the one or more objects and location information about a plurality of second grids including the plurality of second points; and determining illumination of each of the plurality of grids based on the location information about the plurality of first grids and the location information about the plurality of second grids.

18 Claims, 6 Drawing Sheets

(56) References Cited

U.S. PATENT DOCUMENTS

| | | |
|---|---|---|
| 8,411,088 B2 | 4/2013 | Sevastianov et al. |
| 8,692,828 B2 | 4/2014 | Ha |
| 2008/0074420 A1* | 3/2008 | Kuesel .................... G06T 15/06 345/426 |
| 2009/0109220 A1* | 4/2009 | Tomson ................ G06T 15/506 345/424 |
| 2009/0213118 A1* | 8/2009 | Ha .......................... G06T 15/06 345/421 |

FOREIGN PATENT DOCUMENTS

| | | |
|---|---|---|
| KR | 10-2009-0092618 A | 9/2009 |
| KR | 10-2011-0099412 A | 9/2011 |
| KR | 10-1080508 | 11/2011 |
| KR | 10-2014-0013292 A | 2/2014 |

OTHER PUBLICATIONS

Written Opinion dated Mar. 21, 2017, issued by the International Searching Authority in counterpart International Application No. PCT/KR2016/014636 (PCT/ISA/237).

* cited by examiner

METHOD AND DEVICE FOR DETERMINING ILLUMINATION OF 3D VIRTUAL SCENE

TECHNICAL FIELD

Various embodiments relate to a method and device for determining illumination of a three-dimensional (3D) virtual scene, and more particularly, to a method and device for determining illumination of a 3D virtual scene and rendering the 3D virtual scene.

BACKGROUND ART

In rendering a three-dimensional (3D) virtual scene, it is required to determine illumination within the 3D virtual scene. In order to increase the perception of reality of the 3D virtual scene, it is required to take into account not only a direct influence from a light source but also an indirect influence from light reflected from an object in the 3D virtual scene. In the past, in rendering a 3D virtual scene, it has been difficult to reflect the indirect influence from light reflected from an object in the 3D virtual scene.

DESCRIPTION OF EMBODIMENTS

Solution to Problem

An electronic device for rendering a three-dimensional (3D) virtual scene, according to some embodiments, includes: a controller configured to divide the 3D virtual scene by using a plurality of grids, acquire location information about a plurality of first points at which a plurality of rays originating from a light source are incident on one or more objects located within the 3D virtual scene and location information about a plurality of first grids including the plurality of first points, acquire location information about a plurality of second points at which the plurality of rays reflected from the plurality of first points are incident on the one or more objects and location information about a plurality of second grids including the plurality of second points, determine illumination of each of the plurality of grids based on the location information about the plurality of first grids and the location information about the plurality of second grids, and render the 3D virtual scene based on the determined illumination of each of the plurality of grids; and a storage unit configured to store at least one of the location information about the plurality of first points, the location information about the plurality of first grids, the location information about the plurality of second points, the location information about the plurality of second grids, and the information about the determined illumination of each of the plurality of grids.

BEST MODE

Figure 1:
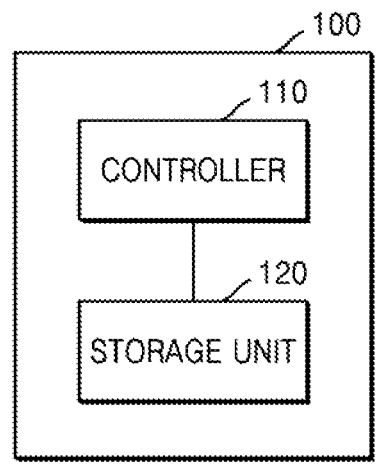
FIG. 1 is a block diagram illustrating a configuration of an electronic device according to an embodiment.

An electronic device for rendering a three-dimensional (3D) virtual scene, according to some embodiments, includes: a controller configured to divide the 3D virtual scene by using a plurality of grids, acquire location information about a plurality of first points at which a plurality of rays originating from a light source are incident on one or more objects located within the 3D virtual scene and location information about a plurality of first grids including the plurality of first points, acquire location information about a plurality of second points at which the plurality of rays reflected from the plurality of first points are incident on the one or more objects and location information about a plurality of second grids including the plurality of second points, determine illumination of each of the plurality of grids based on the location information about the plurality of first grids and the location information about the plurality of second grids, and render the 3D virtual scene based on the determined illumination of each of the plurality of grids; and a storage unit configured to store at least one of the location information about the plurality of first points, the location information about the plurality of first grids, the location information about the plurality of second points, the location information about the plurality of second grids, and information about the determined illumination of each of the plurality of grids.

In one embodiment, at least one of the location information about the plurality of first points, the location information about the plurality of first grids, the location information about the plurality of second points, the location information about the plurality of second grids, and the information about the determined illumination of each of the plurality of grids may be acquired by at least one of ray tracing and rasterization.

In one embodiment, the controller may be further configured to update the illumination of each of the plurality of grids every predetermined time.

In one embodiment, the controller may be further configured to determine the illumination of the plurality of grids based on the location information stored in the storage unit.

In one embodiment, in the determining of the illumination of each of the plurality of grids, the controller may be further configured to determine illumination of a grid corresponding to at least one of the plurality of first grids and the plurality of second grids to be higher than illumination of a grid not corresponding to at least one of the plurality of first grids and the plurality of second grids.

In one embodiment, the illumination of the plurality of rays may be determined to decrease when the plurality of rays are reflected from the one or more objects.[19]

A method of rendering a three-dimensional (3D) virtual scene, according to some embodiments, includes: dividing the 3D virtual scene by using a plurality of grids; acquiring location information about a plurality of first points at which a plurality of rays originating from a light source are incident on one or more objects located within the 3D virtual scene and location information about a plurality of first grids including the plurality of first points; acquiring location information about a plurality of second points at which the plurality of rays reflected from the plurality of first points are incident on the one or more objects and location information about a plurality of second grids including the plurality of second points; determining illumination of each of the plurality of grids based on the location information about the plurality of first grids and the location information about the plurality of second grids; rendering the 3D virtual scene based on the determined illumination of each of the plurality of grids; rendering the 3D virtual scene based on the determined illumination of each of the plurality of grids; and storing at least one of the location information about the plurality of first points, the location information about the plurality of first grids, the location information about the plurality of second points, the location information about the plurality of second grids, and information about the determined illumination of each of the plurality of grids.

In one embodiment, at least one of the location information about the plurality of first points, the location information about the plurality of first grids, the location information about the plurality of second points, the location information about the plurality of second grids, and the information about the determined illumination of each of the plurality of grids may be acquired by at least one of ray tracing and rasterization.

In one embodiment, the determining of the illumination of each of the plurality of grids may include updating the illumination of each of the plurality of grids every predetermined time.

In one embodiment, the illumination of the plurality of grids may be determined based on the stored location information.

In one embodiment, the determining of the illumination of each of the plurality of grids may include determining illumination of a grid corresponding to at least one of the plurality of first grids and the plurality of second grids to be higher than illumination of a grid not corresponding to at least one of the plurality of first grids and the plurality of second grids.

In one embodiment, illumination of the plurality of rays may decrease when the plurality of rays are reflected from the one or more objects.

A recording medium according to some embodiments is a non-transitory computer-readable recording medium having recorded thereon a program for performing a method including: dividing the 3D virtual scene by using a plurality of grids; acquiring location information about a plurality of first points at which a plurality of rays originating from a light source are incident on one or more objects located within the 3D virtual scene and location information about a plurality of first grids including the plurality of first points; acquiring location information about a plurality of second points at which the plurality of rays reflected from the plurality of first points are incident on the one or more objects and location information about a plurality of second grids including the plurality of second points; determining illumination of each of the plurality of grids based on the location information about the plurality of first grids and the location information about the plurality of second grids; rendering the 3D virtual scene based on the determined illumination of each of the plurality of grids; and rendering the 3D virtual scene based on the determined illumination of each of the plurality of grids.

MODE OF DISCLOSURE

Hereinafter, embodiments will be described in detail with reference to the accompanying drawings so that those of ordinary skill in the art can easily carry out the present disclosure. However, the disclosure may be embodied in many different forms and is not limited to the embodiments described herein. In order to clearly describe the present disclosure, parts having no relation to the description are omitted, and like reference numerals are assigned to like elements throughout the specification.

The terms used herein may be used to describe various components, but the components should not be limited by the terms. These terms are only used to distinguish one component from another.

The accompanying drawings may be schematically illustrated to describe one embodiment of the disclosure, and some dimensions may be exaggerated for clarity. Similarly, a substantial portion of the drawings may be arbitrarily represented.

The embodiments described in the disclosure and the accompanying drawings are for describing the disclosure through some of various embodiments of the disclosure, and the disclosure is not limited to the embodiments described herein or the accompanying drawings.

The term "first point" used in embodiments of the present disclosure refers to a point at which rays originating from a light source are incident on one or more objects located within a three-dimensional (3D) virtual scene.

The term "first grid" used in embodiments of the present disclosure refers to a grid including a first point when a 3D virtual scene is divided by using a plurality of grids.

The term "second point" used in embodiments of the present disclosure refers to a point at which rays reflected from a first point are incident on one or more objects located within a 3D virtual scene.

The term "second grid" used in embodiments of the present disclosure refers to a grid including a second point when a 3D virtual scene is divided by using a plurality of grids.

The term "contribution" used in embodiments of the present disclosure refers to making rays be incident on a specific location of a specific object so as to increase the illumination of the specific location.

FIGS. 1 to 9 are diagrams illustrating embodiments of the present disclosure. The drawings are not drawn with a particular scale, and the drawings are intended to help the understanding of the present disclosure and should not be construed as limiting the scope of the present disclosure. The same reference numerals are assigned to the same elements in different drawings for consistency and clarity.

Hereinafter, the present disclosure will be described in detail with reference to the accompanying drawings.

FIG. 1 is a block diagram illustrating a configuration of an electronic device according to an embodiment.

The electronic device 100 may include, for example, a controller 110 and a storage unit 120.

In one embodiment, the controller 110 may divide a 3D virtual scene by using a plurality of grids.

In one embodiment, the controller 110 may acquire location information about a plurality of first points at which a plurality of rays originating from a light source are incident on one or more objects located within a 3D virtual scene and location information about a plurality of first grids including the plurality of first points.

In one embodiment, the light source may be located within the 3D virtual scene, and examples of the light source may include the sun, a fluorescent lamp, and the like within the 3D virtual scene.

In one embodiment, the one or more objects may be present within the 3D virtual object. The one or more objects may be, for example, any object including a wall, a person, a building, a tree, or the like.

In one embodiment, the controller 110 may be executed by at least one of software and hardware capable of functionally determining locations at which rays are incident on the one or more objects. For example, the controller 110 may be a rasterizer.

In one embodiment, the controller 110 may include one or more microprocessors, a microcomputer, a microcontroller, a digital signal processing unit, a central processing unit (CPU), a state machine, an operation circuit, and/or other devices capable of processing or manipulating a signal based on an operation command.

In one embodiment, the controller 110 may acquire location information about a plurality of second points at which a plurality of rays reflected from the plurality of first points are incident on the one or more objects and location information about a plurality of second grids including the plurality of second points.

In one embodiment, the controller 110 may determine the illumination of each of the plurality of grids based on the location information about the plurality of first grids and the location information about the plurality of second grids.

In one embodiment, the grid within the 3D virtual scene may correspond to at least one of the first grid and the second grid, or may not correspond to both the first grid and the second grid. When the grid corresponds to the first grid and the second grid, the illumination may be determined by adding the contribution of light by the first grid and the contribution of light by the second grid.

In one embodiment, rays from the light source within the grid in the 3D virtual scene may be directly incident on one or more objects 220 and 230 within the 3D virtual scene, and may be indirectly incident after being reflected from the one or more objects 220 and 230.

In one embodiment, in determining the illumination of each of the plurality of grids, the illumination of the grid corresponding to at least one of the first grid and the second grid may be determined to be higher than the illumination of the grid not corresponding to at least one of the first grid and the second grid.

In one embodiment, in determining the illumination of each of the plurality of grids, the controller 110 may take into account a distance at which the ray originating from the light source is moved from the light source, whether the ray has been reflected from the one or more objects, the number of times of reflections, and whether the grid corresponds to at least one of the first grid and the second grid.

In one embodiment, the controller 110 may update the illumination of each of the plurality of grids every predetermined time. In this manner, the change in the one or more objects or the light source within the 3D virtual scene according to the time may be reflected to the illumination of each of the plurality of grids. The change in the one or more objects and the light source within the 3D virtual scene according to the time may include a change in location, a change in shape, and a change in property, but is not limited thereto.

In one embodiment, the controller 110 may render the 3D virtual scene based on the determined illumination of each of the plurality of grids.

In one embodiment, at least one of the location information about the plurality of first points, the location information about the plurality of first grids, the location information about the plurality of second points, the location information about the plurality of second grids, and the information about the determined illumination of each of the plurality of grids may be acquired by at least one of ray tracing and rasterization.

In one embodiment, the storage unit 120 may store at least one of the location information about the plurality of first points, the location information about the plurality of first grids, the location information about the plurality of second points, the location information about the plurality of second grids, and the information about the determined illumination of each of the plurality of grids.

In one embodiment, the storage unit 120 may include at least one of a volatile memory (e.g., dynamic random access memory (DRAM), static RAM (SRAM), synchronous DRAM (SDRAM), etc.), a non-volatile memory (e.g., one time programmable read-only memory (OTPROM), programmable ROM (PROM), erasable and programmable ROM (EPROM), electrically erasable and programmable ROM (EEPROM), mask ROM, flash ROM, etc.), hard disk drive (HDD), and solid state drive (SSD). In one embodiment, the storage unit 120 may include a database.

In one embodiment, information stored in the storage unit 120 may be stored temporarily or permanently.

In one embodiment, the illumination of each of the plurality of grids may be determined based on the information stored in the storage unit 120.

The block diagram of the electronic device 100 illustrated in FIG. 1 is a block diagram for one embodiment. The respective components of the block diagram may be integrated, added, or omitted according to the specification of the electronic device 100 actually implemented. That is, if necessary, two or more components may be integrated into one component, or one component may be divided into two or more components.

In addition, the functions performed by the respective blocks are provided for describing the embodiments, and specific operations or devices thereof do not limit the scope of the present disclosure.

Figure 2:
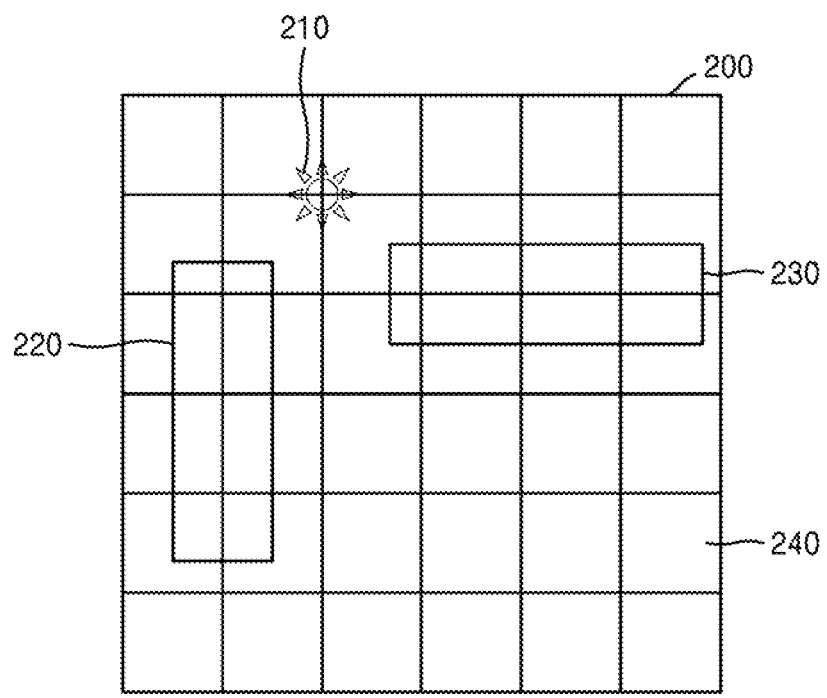
FIG. 2 is a diagram illustrating a three-dimensional (3D) virtual scene according to an embodiment.

FIG. 2 is a diagram illustrating a 3D virtual scene according to an embodiment.

A 3D virtual scene 200 may be used in, for example, the design industry employing games, simulations, or computers.

The virtual scene is represented like two-dimension (2D), but those of ordinary skill in the art can easily understand that this is merely for convenience of description and is provided for describing the 3D virtual scene 200.

The sun mark illustrated in FIG. 2 indicates a light source 210, and two rectangles indicate one or more objects 220 and 230.

A space in the 3D virtual scene 200 may be divided for convenience of illumination arrangement determination of the 3D virtual scene 200 by rays originating from the light source 210. In one embodiment, as illustrated in FIG. 2, the 3D virtual scene 200 may be divided into a plurality of grids 240. The grid may be, for example, a voxel grid.

Figure 3:
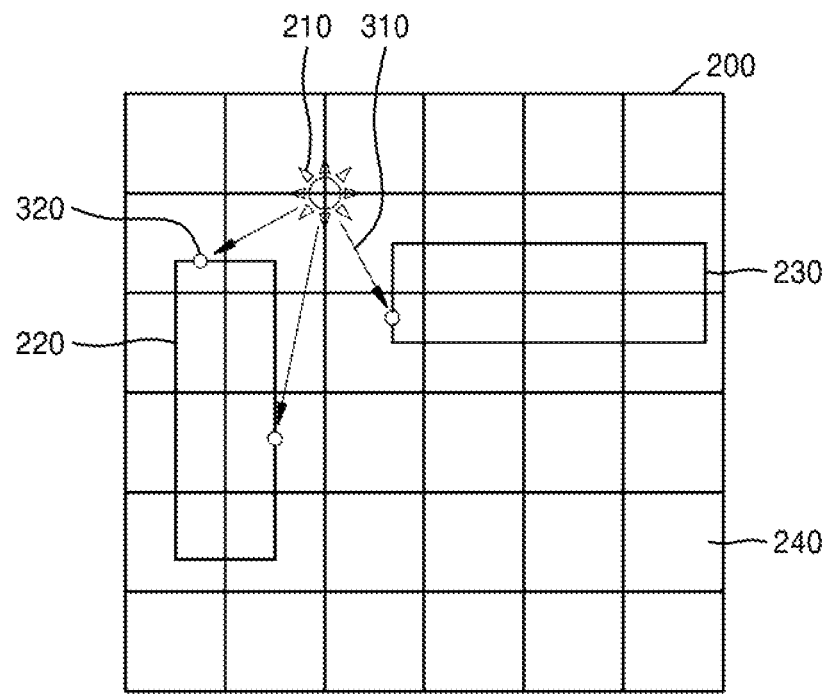
FIG. 3 is a diagram illustrating first points in the 3D virtual scene, according to an embodiment.

FIG. 3 is a diagram illustrating first points in the 3D virtual scene, according to an embodiment.

In one embodiment, a plurality of rays 310 originating from the light source 210 may be incident on the one or more objects 220 and 230 located within the 3D virtual scene 200. When the plurality of rays 310 are incident on the one or more objects 220 and 230, the electronic device 100 may determine a first point 320.

In one embodiment, as the rays are derived from the light source 210 and then moved, the electronic device 100 may determine that the illumination of the rays gradually decreases.

Figure 4:
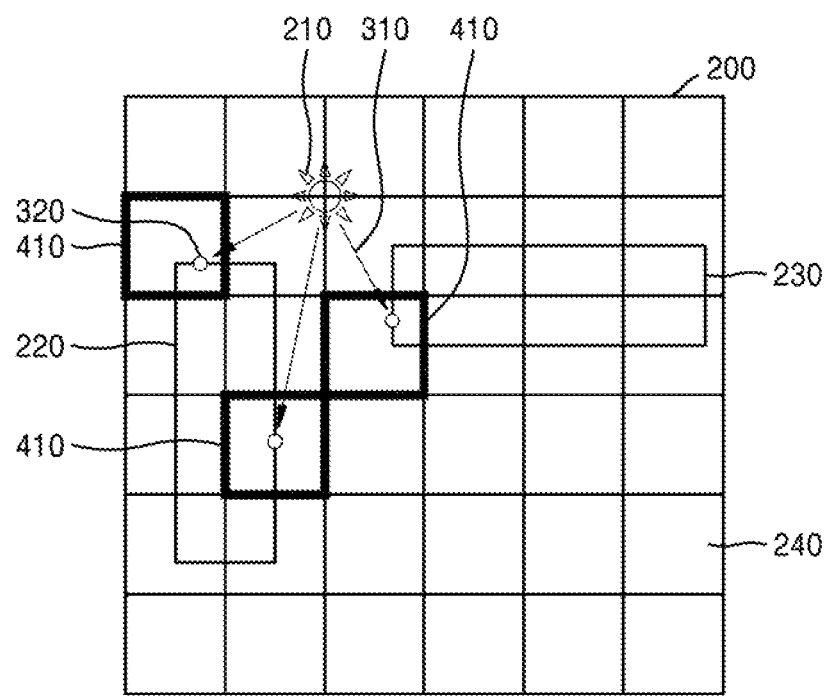
FIG. 4 is a diagram illustrating first grids in the 3D virtual scene, according to an embodiment.

FIG. 4 is a diagram illustrating first grids in the 3D virtual scene, according to an embodiment.

In one embodiment, when the plurality of rays 310 are incident on the one or more objects 220 and 230, the electronic device 100 may determine a first point 320 and may determine a first grid 410 including the first point 320.

In one embodiment, the determination of the first point 320 and the first grid 410 may be performed by ray tracing, rasterization, or methods similar thereto. In the ray tracing, the electronic device 100 may detect locations at which the rays are incident on the one or more objects within the 3D virtual scene, based on derivation points and vectors of the rays. In the rasterization, the electronic device 100 may detect which portion of the one or more objects 220 and 230 within the 3D virtual scene 200 appears in the light source 210, and thus, may detect which portion is illuminated by the light source 210.

Figure 5:
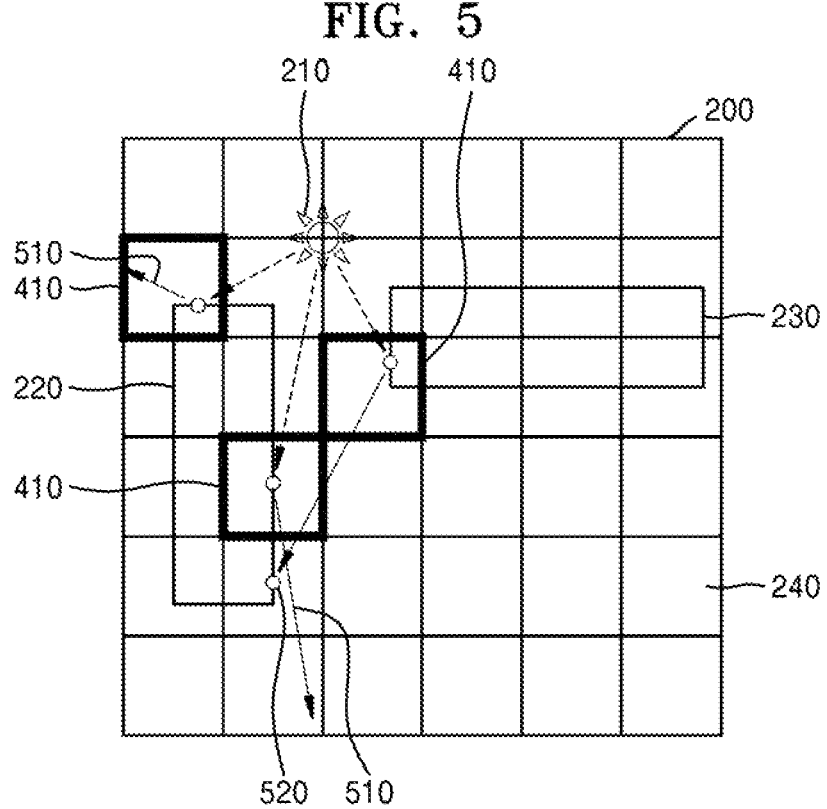
FIG. 5 is a diagram illustrating second points in the 3D virtual scene, according to an embodiment.

FIG. 5 is a diagram illustrating second points in the 3D virtual scene, according to an embodiment.

In one embodiment, a plurality of rays 510 reflected from the first point 320 may be incident on the one or more objects 220 and 230 located within the 3D virtual scene 200. When the plurality of rays 510 reflected from the first point 320 are incident on the one or more objects 220 and 230, the electronic device 100 may determine a second point 520.

In one embodiment, when the rays 310 are reflected from the one or more objects 220 and 230 located within the 3D virtual scene 200, the illumination of the reflected rays 510 may be determined to be lower than the illumination of the rays 310 prior to the reflection.

Figure 6:
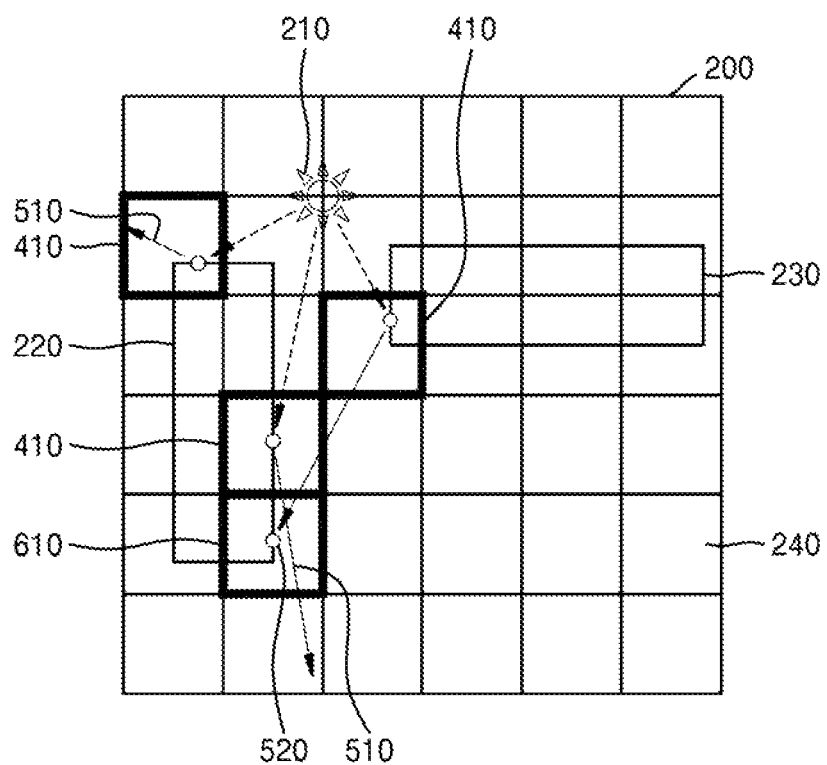
FIG. 6 is a diagram illustrating second grids in the 3D virtual scene, according to an embodiment.

FIG. 6 is a diagram illustrating second grids in the 3D virtual scene, according to an embodiment.

In one embodiment, when the plurality of rays 510 reflected from the first point 320 are incident on the one or more objects 220 and 230 located within the 3D virtual scene 200, the electronic device 100 may determine a second point 520 and may determine a second grid 610 including the second point 520.

Figure 7A:
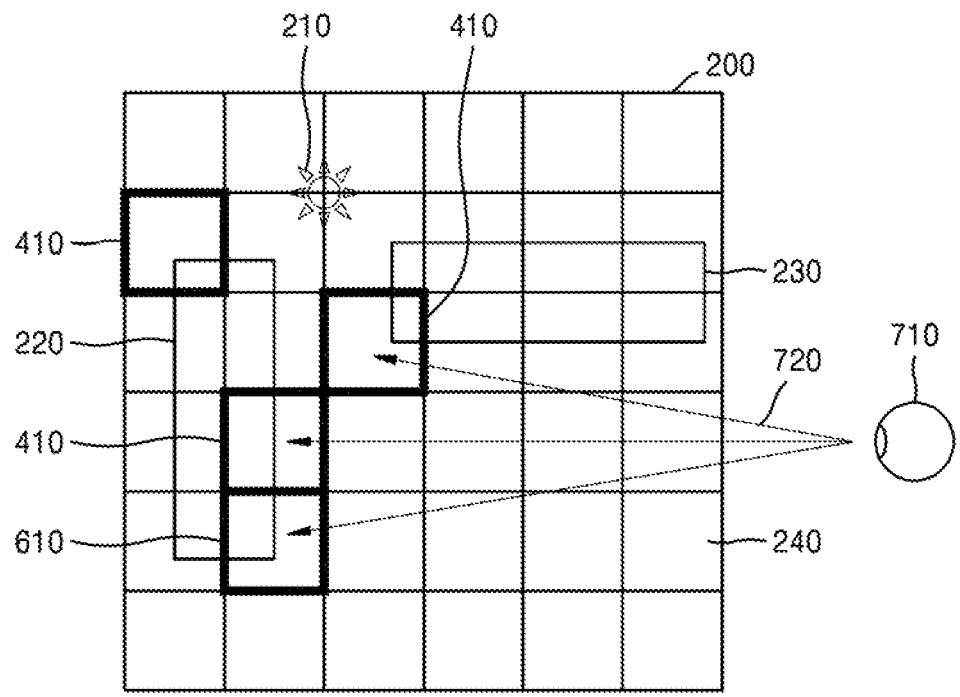
FIGS. 7A and 7B are diagrams illustrating rendering of the 3D virtual scene, according to an embodiment.
Figure 7B:
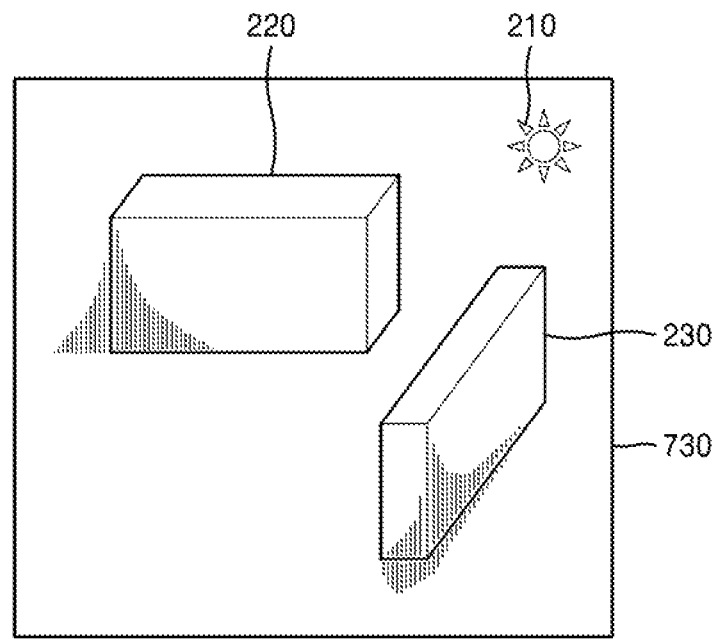

FIGS. 7A and 7B are diagrams illustrating rendering of the 3D virtual scene, according to an embodiment.

In one embodiment, the electronic device 100 may add direct or indirect contributions of the light source to the illumination of a specific grid within the 3D virtual scene 200, determine a current illumination of a plurality of grids within the 3D virtual scene 200, and render the 3D virtual scene 200 with reference to the determined current illumination of the grids.

In one embodiment, the 3D virtual scene 200 may be rendered so as to be displayed on a display device. That the electronic device 100 renders the 3D virtual scene 200 is not limited to rendering to a single 2D image. For example, the 3D virtual scene 200 may be rendered to a plurality of 2D or 3D images at short time intervals.

In one embodiment, the electronic device 100 may determine an observation location 710 which is the basis of the rendering. More specifically, the controller 110 may determine the observation location 710 which is the basis of the rendering. For example, in the case of a 3D game in which a specific person located within the 3D virtual scene 200 plays a main character, the eyes of the main character may be determined as the observation location 710.

In one embodiment, the electronic device 100 may render the 3D virtual scene 200 observed (720) at the observation location 710 with reference to the determined observation location 710. More specifically, the controller 110 may render the 3D virtual scene 200 with reference to the determined observation location 710. For example, when the eyes of the main character located within the 3D virtual scene 200 are determined as the observation location, the 3D virtual scene 200 may be rendered with reference to the eyes of the main character. FIG. 7B illustrates an example 730 of rendering the 3D virtual scene 200.

Since a location of an object observed at the line of vision of the main character and a location of light and shade are changed according to a change in the location of the main character, the rendering result may also be changed. In other words, when the observation location is changed because the main character is changed or the location of the main character is changed, the rendering result may be changed.

Figure 8:
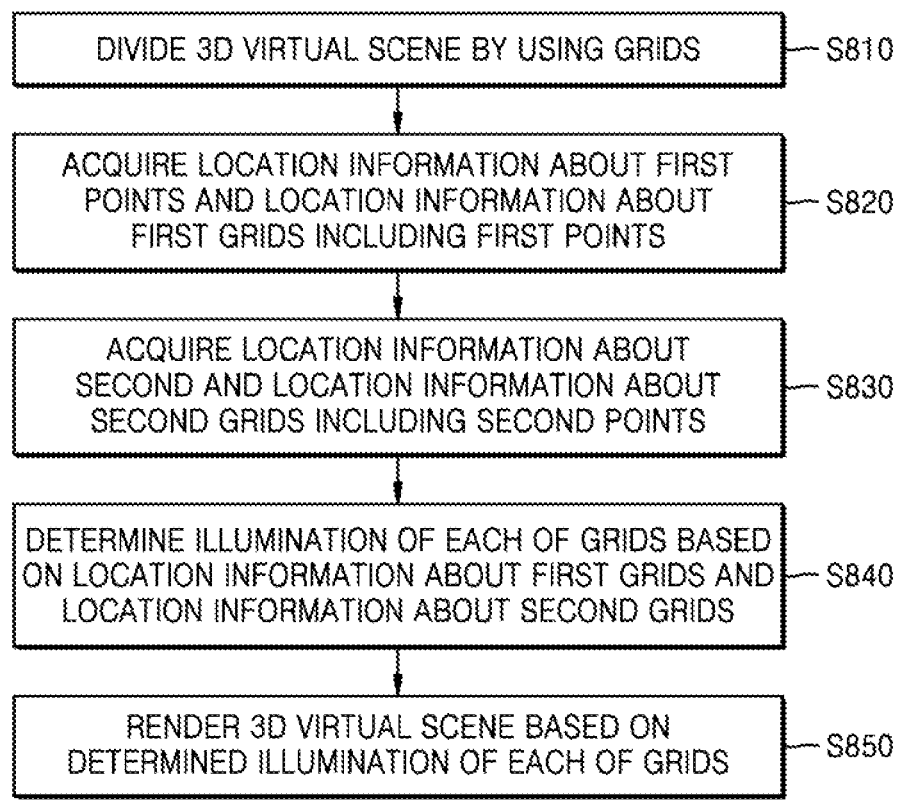
FIG. 8 is a flowchart of a method of operating an electronic device, according to an embodiment.

FIG. 8 is a flowchart of a method of operating an electronic device, according to an embodiment.

Since operations 810 to 850 are performed by the operations of the respective components of the electronic device 100, the description of operations 810 to 850 may be redundant to the description of FIGS. 1 to 7. Therefore, for simplicity of description, the description of specific parts among the redundant contents will be omitted.

In operation 810, the electronic device 100 may divide a 3D virtual scene 200 by using a plurality of grids 240.

In operation 820, the electronic device 100 may acquire location information about a plurality of first points 320 at which a plurality of rays 310 originating from a light source 210 are incident on one or more objects 220 and 230 located within the 3D virtual scene 200 and location information about a plurality of first grids 410 including the plurality of first points 320.

In operation 830, the electronic device 100 may acquire location information about a plurality of second points 520 at which a plurality of rays 510 reflected from the plurality of first points 320 are incident on the one or more objects 220 and 230 and location information about a plurality of second grids 610 including the plurality of second points 520.

In operation 840, the electronic device 100 may determine the illumination of each of the plurality of grids based on the location information about the plurality of first grids 410 and the location information about the plurality of second grids 610.

In one embodiment, the electronic device 100 may update the illumination of each of the plurality of grids every predetermined time.

In operation 850, the electronic device 100 may render the 3D virtual scene 200 based on the determined illumination of each of the plurality of grids.

Figure 9:
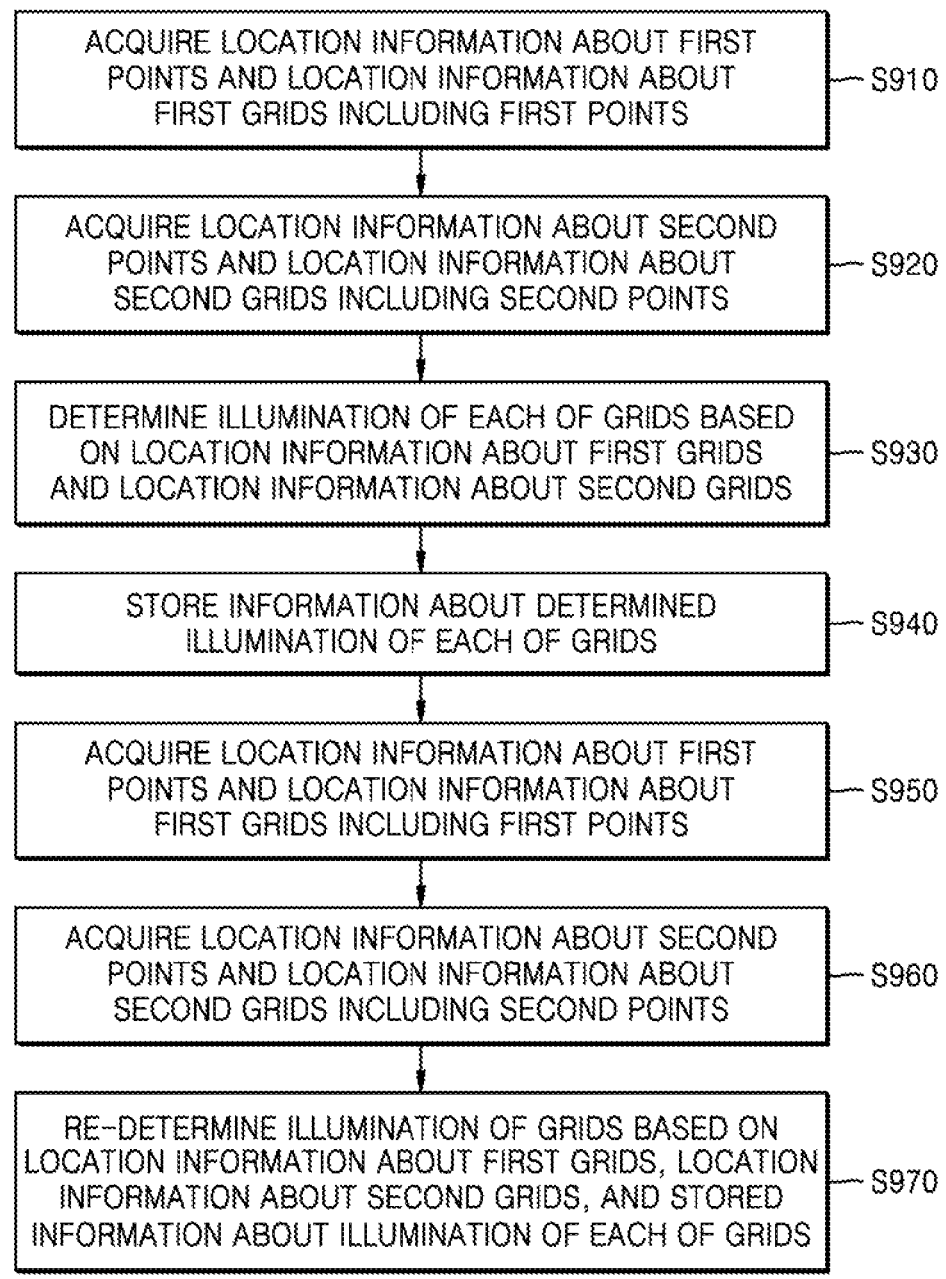
FIG. 9 is a flowchart of a method of determining illumination of a 3D virtual scene, according to an embodiment.

FIG. 9 is a flowchart of a method of determining illumination of a 3D virtual scene, according to an exemplary embodiment.

In operation 910, the electronic device 100 may acquire location information about a plurality of first points 320 at which a plurality of rays 310 originating from a light source 210 are incident on one or more objects located within a 3D virtual scene 200 and location information about a plurality of first grids 410 including the plurality of first points 320.

In operation 920, the electronic device 100 may acquire location information about a plurality of second points 520 at which a plurality of rays 510 reflected from the plurality of first points 320 are incident on the one or more objects 220 and 230 and location information about a plurality of second grids 610 including the plurality of second points 520.

In operation 930, the electronic device 100 may determine the illumination of each of the plurality of grids based on the location information about the plurality of first grids 410 and the location information about the plurality of second grids 610.

In operation 940, the electronic device 100 may store information about the illumination of each of the plurality of grids.

In operation 950, the electronic device 100 may acquire location information about a plurality of first points 320 at which a plurality of rays originating from a second light source are incident on one or more objects located within a 3D virtual scene 200 and location information about a plurality of first grids 410 including the plurality of first points.

In one embodiment, the second light source may be a light source separate from a first light source. For example, the first light source may be the sun, and the second light source may be a stand.

Alternatively, when the rays originating from the first light source are reflected from the one or more objects 220 and 230 within the 3D virtual scene 200, the reflection point may become the second light source and newly perform the role of the light source.

In operation 960, the electronic device 100 may acquire location information about a plurality of second points 520 at which a plurality of rays 510 reflected from the plurality of first points 320 are incident on the one or more objects and location information about a plurality of second grids 610 including the plurality of second points 520.

In operation 970, the electronic device 100 may re-determine the illumination of each of the plurality of grids based on the location information about the plurality of first grids 410, the location information about the plurality of second grids 610, and the information about the illumination of each of the plurality of grids.

Operations 910 to 970 handle up to the process in which the rays reflected once from specific locations of the one or more objects 220 and 230 are incident on other locations, but those of skill in the art can easily understand the feature in which rays may be reflected multiple times from various locations of the one or more objects 220 and 230, and the electronic device 100 may re-determine (update) the illumination of each of the plurality of grids within the 3D virtual scene 200 by combining the light accumulated in each of the plurality of grids within the 3D virtual scene 200 while being reflected multiple times.

It will be understood by those of ordinary skill in the art that the foregoing description of the disclosure is intended to be illustrative, and various changes or modifications in form may be made thereto without departing from the spirit and scope of the disclosure and the essential features. It is therefore to be understood that the above-described embodiments are illustrative in all aspects and not restrictive. For example, each component described as a single form may be distributed and implemented, and components described as being distributed may also be implemented in a combined form.

It will be understood that the scope of right of the disclosure may be indicated by the following claims, and all changes or modifications derived from the meaning and scope of the claims and the concept of equivalence should be construed as falling within the scope of the present disclosure.

The invention claimed is:

1. An electronic device for rendering a three-dimensional (3D) virtual scene, the electronic device comprising:
 a storage unit; and
 at least one processor configured to:
  divide the 3D virtual scene by using a plurality of grids,
  obtain location information about a plurality of first points at which a plurality of rays originating from a light source located within the 3D virtual scene are incident on one or more objects located within the 3D virtual scene and location information about a plurality of first grids including the plurality of first points,
  obtain location information about a plurality of second points at which the plurality of rays reflected from the plurality of first points are incident on the one or more objects and location information about a plurality of second grids including the plurality of second points,
  identify illumination of each of the plurality of grids based on the location information about the plurality of first grids and the location information about the plurality of second grids, and
  render the 3D virtual scene based on the identified illumination of each of the plurality of grids.

2. The electronic device of claim 1, wherein at least one of the location information about the plurality of first points, the location information about the plurality of first grids, the location information about the plurality of second points, the location information about the plurality of second grids, and the information about the identified illumination of each of the plurality of grids is obtained by at least one of ray tracing and rasterization.

3. The electronic device of claim 1, wherein the at least one processor is further configured to update the illumination of each of the plurality of grids every predetermined time.

4. The electronic device of claim 1, wherein the at least one processor is further configured to identify the illumination of the plurality of grids based on the location information stored in the storage unit.

5. The electronic device of claim 1, wherein in the identifying of the illumination of each of the plurality of grids, the at least one processor is further configured to identify illumination of a grid corresponding to at least one of the plurality of first grids and the plurality of second grids to be higher than illumination of a grid not corresponding to at least one of the plurality of first grids and the plurality of second grids.

6. The electronic device of claim 1, wherein illumination of the plurality of rays is identified to decrease when the plurality of rays are reflected from the one or more objects.

7. A method of rendering a three-dimensional (3D) virtual scene, the method comprising:
 dividing the 3D virtual scene by using a plurality of grids;
 obtaining location information about a plurality of first points at which a plurality of rays originating from a light source located within the 3D virtual scene are incident on one or more objects located within the 3D virtual scene and location information about a plurality of first grids including the plurality of first points;
 obtaining location information about a plurality of second points at which the plurality of rays reflected from the plurality of first points are incident on the one or more objects and location information about a plurality of second grids including the plurality of second points;
 identifying illumination of each of the plurality of grids based on the location information about the plurality of first grids and the location information about the plurality of second grids; and
 rendering the 3D virtual scene based on the identified illumination of each of the plurality of grids.

8. The method of claim 7, wherein at least one of the location information about the plurality of first points, the location information about the plurality of first grids, the location information about the plurality of second points, the location information about the plurality of second grids, and the information about the identified illumination of each of the plurality of grids is obtained by at least one of ray tracing and rasterization.

9. The method of claim 7, wherein the identifying of the illumination of each of the plurality of grids comprises updating the illumination of each of the plurality of grids every predetermined time.

10. The method of claim 7, wherein the illumination of the plurality of grids is identified based on the stored location information.

11. The method of claim 7, wherein the identifying of the illumination of each of the plurality of grids comprises identifying illumination of a grid corresponding to at least one of the plurality of first grids and the plurality of second grids to be higher than illumination of a grid not corresponding to at least one of the plurality of first grids and the plurality of second grids.

12. The method of claim 7, wherein illumination of the plurality of rays decreases when the plurality of rays are reflected from the one or more objects.

13. A computer program product comprising a computer readable storage medium having a computer readable program stored therein, when executed on a computing device, causes the computing device to:
    divide the 3D virtual scene by using a plurality of grids;
    obtain location information about a plurality of first points at which a plurality of rays originating from a light source located within the 3D virtual scene are incident on one or more objects located within the 3D virtual scene and location information about a plurality of first grids including the plurality of first points;
    obtain location information about a plurality of second points at which the plurality of rays reflected from the plurality of first points are incident on the one or more objects and location information about a plurality of second grids including the plurality of second points;
    identify illumination of each of the plurality of grids based on the location information about the plurality of first grids and the location information about the plurality of second grids; and
    render the 3D virtual scene based on the identified illumination of each of the plurality of grids.

14. The computer program product of claim 13, wherein at least one of the location information about the plurality of first points, the location information about the plurality of first grids, the location information about the plurality of second points, the location information about the plurality of second grids, and the information about the identified illumination of each of the plurality of grids is obtained by at least one of ray tracing and rasterization.

15. The computer program product of claim 13, wherein the identifying of the illumination of each of the plurality of grids comprises updating the illumination of each of the plurality of grids every predetermined time.

16. The computer program product of claim 13, wherein the illumination of the plurality of grids is identified based on the stored location information.

17. The computer program product of claim 13, wherein the identifying of the illumination of each of the plurality of grids comprises identifying illumination of a grid corresponding to at least one of the plurality of first grids and the plurality of second grids to be higher than illumination of a grid not corresponding to at least one of the plurality of first grids and the plurality of second grids.

18. The computer program product of claim 13, wherein illumination of the plurality of rays decreases when the plurality of rays are reflected from the one or more objects.

* * * * *